(12) United States Patent
Klinkman et al.

(10) Patent No.: US 7,458,490 B2
(45) Date of Patent: Dec. 2, 2008

(54) ARTICLE CARRIER ASSEMBLY WITH REMOVABLE STOWABLE CROSS-RAILS AND LATCHING MECHANISM THEREFOR

(75) Inventors: John E. Klinkman, Riley Township, MI (US); Terry L. Obermesik, Port Huron, MI (US); Kevin D. Wilson, Lakeport, MI (US); Robert G. Cronce, Port Huron, MI (US)

(73) Assignee: Sportrack LLC, Sterling Heights, MI (US)

( * ) Notice: Subject to any disclaimer, the term of this patent is extended or adjusted under 35 U.S.C. 154(b) by 635 days.

(21) Appl. No.: 10/946,705

(22) Filed: Sep. 22, 2004

(65) Prior Publication Data

US 2006/0060621 A1 Mar. 23, 2006

(51) Int. Cl.
*B60R 9/00* (2006.01)
*B60R 7/00* (2006.01)

(52) U.S. Cl. ............... 224/321; 315/317; 315/322; 315/323; 315/310; 315/324; 548/549; 548/553

(58) Field of Classification Search ................. 224/310, 224/322, 548, 549, 553, 324, 321, 315, 317, 224/323
See application file for complete search history.

(56) References Cited

U.S. PATENT DOCUMENTS

| 4,469,261 | A  | * | 9/1984  | Stapleton et al. | ........... 224/321 |
| 6,286,739 | B1 | * | 9/2001  | Stapleton       | ............... 224/321 |
| 6,959,845 | B2 | * | 11/2005 | Aftanas et al.  | ............ 224/321 |
| 7,066,364 | B2 | * | 6/2006  | Kmita et al.    | .............. 224/321 |

* cited by examiner

*Primary Examiner*—Nathan J Newhouse
*Assistant Examiner*—Lester L Vanterpool
(74) *Attorney, Agent, or Firm*—Rader, Fishman & Grauer PLLC

(57) ABSTRACT

An article carrier assembly for attachment to a vehicle roof panel comprises two siderails and at least one cross-rail releasably stowed on one of the siderails. Attachment of the cross-rail to the siderails is carried out with the use of latching mechanisms. The mechanism is composed of a stanchion mounted on the cross-rail, with a lever pivotally placed therein, and of a lock plate assembly slidably attached to the siderail. For deployment of the assembly, the stanchion is put on the lock plate assembly which becomes engaged therewith upon turning the lever. The structure of the mechanism contributes to preventing the roof panel from being damaged upon the deployment.

15 Claims, 7 Drawing Sheets

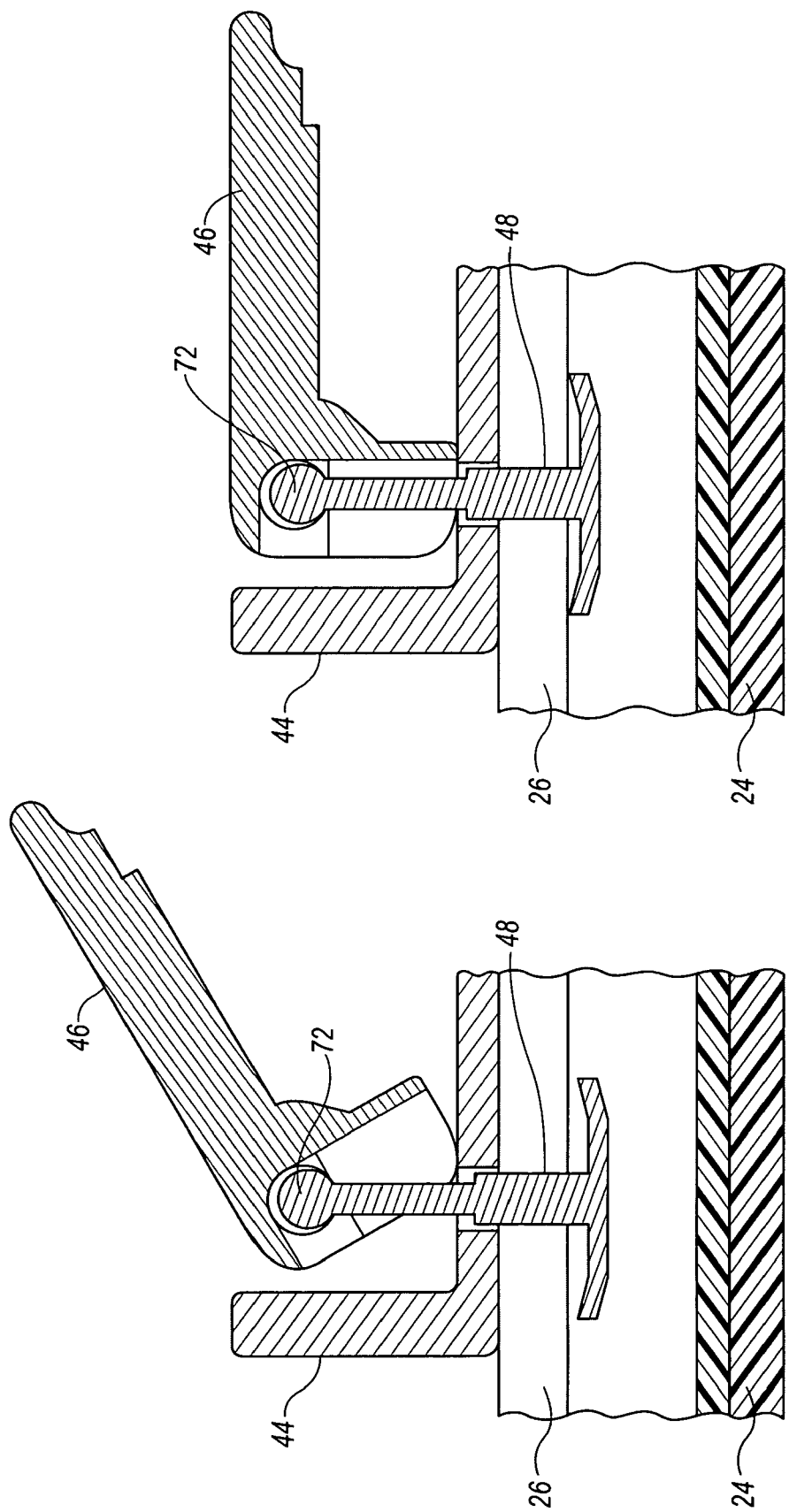

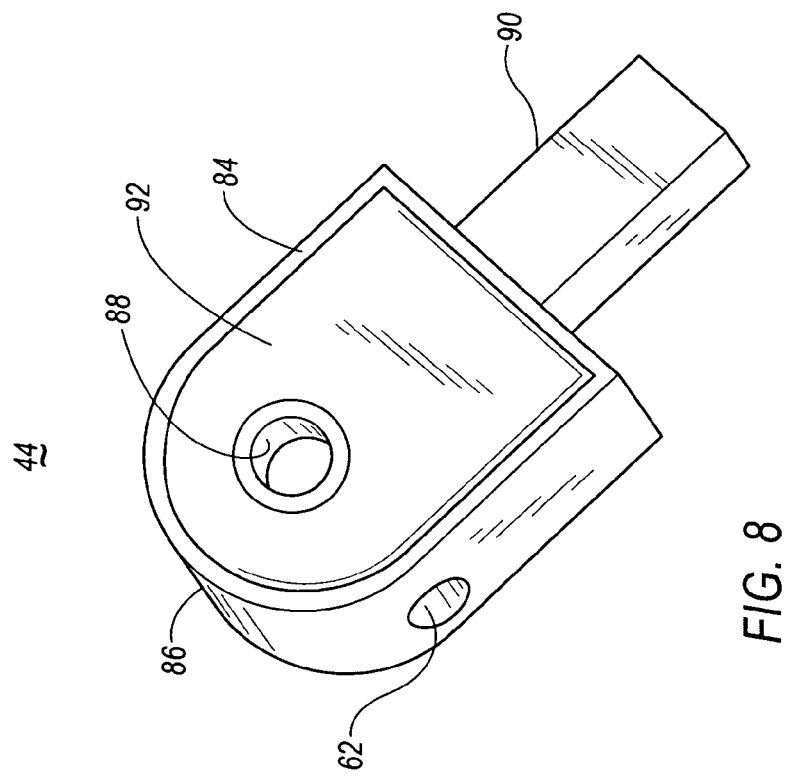
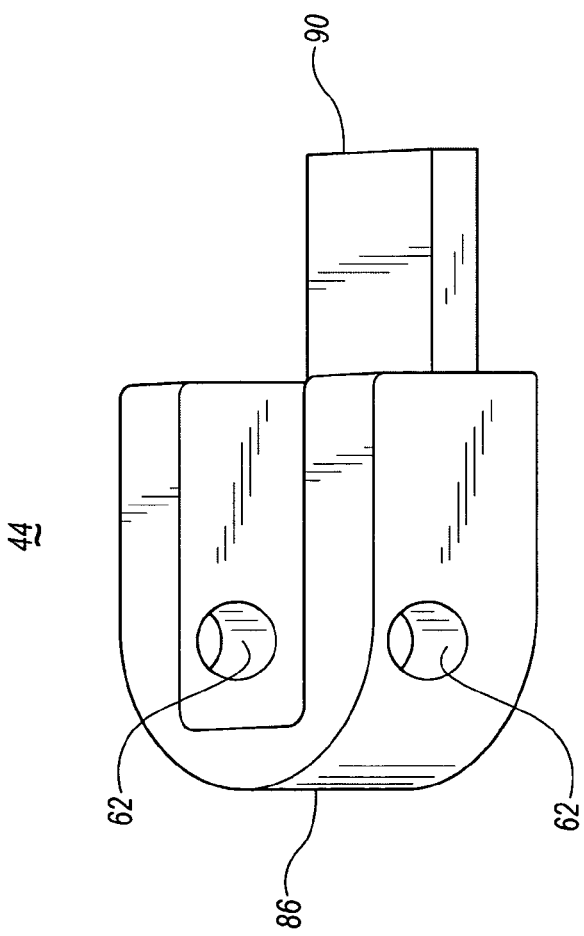
FIG. 8
FIG. 7

ARTICLE CARRIER ASSEMBLY WITH REMOVABLE STOWABLE CROSS-RAILS AND LATCHING MECHANISM THEREFOR

BACKGROUND OF THE INVENTION

1. Technical Field

The present invention relates generally to article carrier assemblies for attachment to a vehicle roof panel with improved styling and functionality, and, more particularly, to the assemblies making use of stowable or removable cross-rails. Even more particularly, the invention relates to the assembly with removable stowable cross-rails and a latching mechanism for the assembly.

2. Description of the Related Art

Typical vehicle article carrier assemblies include a pair of siderails mounted to a vehicle roof panel with at least one cross-rail extending therebetween. Retainers on opposing ends of the cross-rail attach the cross-rail to the siderails. The retainers are usually secured to the siderails by latches or other such mechanisms. The retainers, cross-rails and latches, however, create design problems in that such components may be bulky, and it is difficult to combine trim styling with sufficient strength for supporting an article on the carrier assembly. This leads to disadvantages.

One disadvantage of conventional designs is that the cross-rails create wind noise when the vehicle is driven. Buzz, squeak, and rattle (BSR), as well as noise, vibration and harshness (NVH) associated with the article carrier assembly are inevitable when the article carrier assembly is being used, due to the article itself. Nonetheless, the wind noise is undesirable, especially when the article carrier assembly is not being used. In addition, the cross-rails increase vehicle drag. Finally, it is difficult to provide cross-rails in the form of a trim rail for styling purposes without sacrificing structural integrity. Accordingly, the styling suffers.

One approach taken in the art to address some of the shortcomings described above involves providing removable cross-rails. In this approach, the cross-rails are removable, and may be stored, for example, in the vehicle owner's garage or the like when not in use. However, a significant shortcoming of this approach is that the cross-rails are not always with the vehicle. Therefore, on those occasions where use of the article carrier assembly arises unexpectedly, the article carrier assembly cannot be used because the removable cross-rails are not stored with the vehicle.

Also known in the art are engineering solutions that overcome the above-identified disadvantage. Cross-rails are provided that are stowed in corresponding siderails when they are not needed. This approach reduces both BSR and NVH associated with the article carrier assembly. Such an approach also minimizes vehicle drag. In addition, a fully functional article carrier assembly is self-contained. That is, the cross-rails are always with the vehicle, even when the carrier assembly is not in use. Also, improved styling is accomplished inasmuch as the article carrier assembly, when the cross-rails are stowed, conveys the look of stand-alone siderails.

This solution, however, is relatively cumbersome, and the use of its locking mechanism is fraught with potential damage of the roof surface during operation. There is therefore a need to provide an article carrier assembly with a locking mechanism that while keeping advantages of the prior art would reduce or eliminate the shortcomings set forth above.

SUMMARY OF THE INVENTION

One object of the present invention is to provide an article carrier assembly that has a ready-to-transform-for-use structure and reduces or eliminates wind noise and vehicle drag when not in use while presenting stylishly.

Another object of the present invention is to provide an article carrier assembly that, when being deployed, prevents the vehicle roof from damage.

The present invention achieves these and other objects, and overcomes the above-referenced shortcomings of conventional article carrier by providing an assembly of siderails and cross-rails, and a latching mechanism therefor, the cross-rails being stowed in corresponding siderails when unneeded. The concept of a stowable system suggested in the present invention allows latching mechanisms, as a whole, not to travel with the cross-rails during operation. Rather, they stay partially attached to the siderails. Therefore, the advantage of using a stowable system can be realized without the concern for the damage of the roof. As prior art designs used mechanisms that travel with the cross-rails, which resulted in the locking feature hanging from the bottom of the stanchion and potentially damaging the roof surface during operation, the latching mechanism according to the present invention uses a lock plate assembly with a stud remaining in the siderail during the stowing or deployment of the cross-rails. The stud has a ball on the end that is used to aid in clamping. The lever/stanchion is dropped over the ball stud and engages therewith when latched. The lock plate assembly with the ball allows the cross-rails to be releasably attached to the siderails and to be removed while the lock plate stays in the siderails. In its entirety, the assembly advantageously protects the vehicle roof from damage when it is being deployed. The assembly also reduces both BSR and NVH associated with the article carrier and minimizes vehicle drag. A fully functional assembly is self-contained, that is the cross-rails can always be with the vehicle, even when the assembly is not in use. Additionally, the present invention provides for improved styling inasmuch as the article carrier assembly, when the cross-rails are stowed, conveys the look of stand-alone siderails.

BRIEF DESCRIPTION OF THE DRAWINGS

The above objects and other objects, features and advantages of the present invention will be readily apparent from the following detailed description of the best mode of carrying out the invention when read in connection with the accompanying drawings, in which like reference characters refer to like parts throughout the views, and in which:

FIG. 7 shows a perspective view of a stanchion of the latching mechanism as viewed from the top thereof; and FIG. 8 shows a perspective view of a stanchion of the latching mechanism as viewed from the bottom thereof.

DETAILED DESCRIPTION OF THE PREFERRED EMBODIMENT

Figure 1:
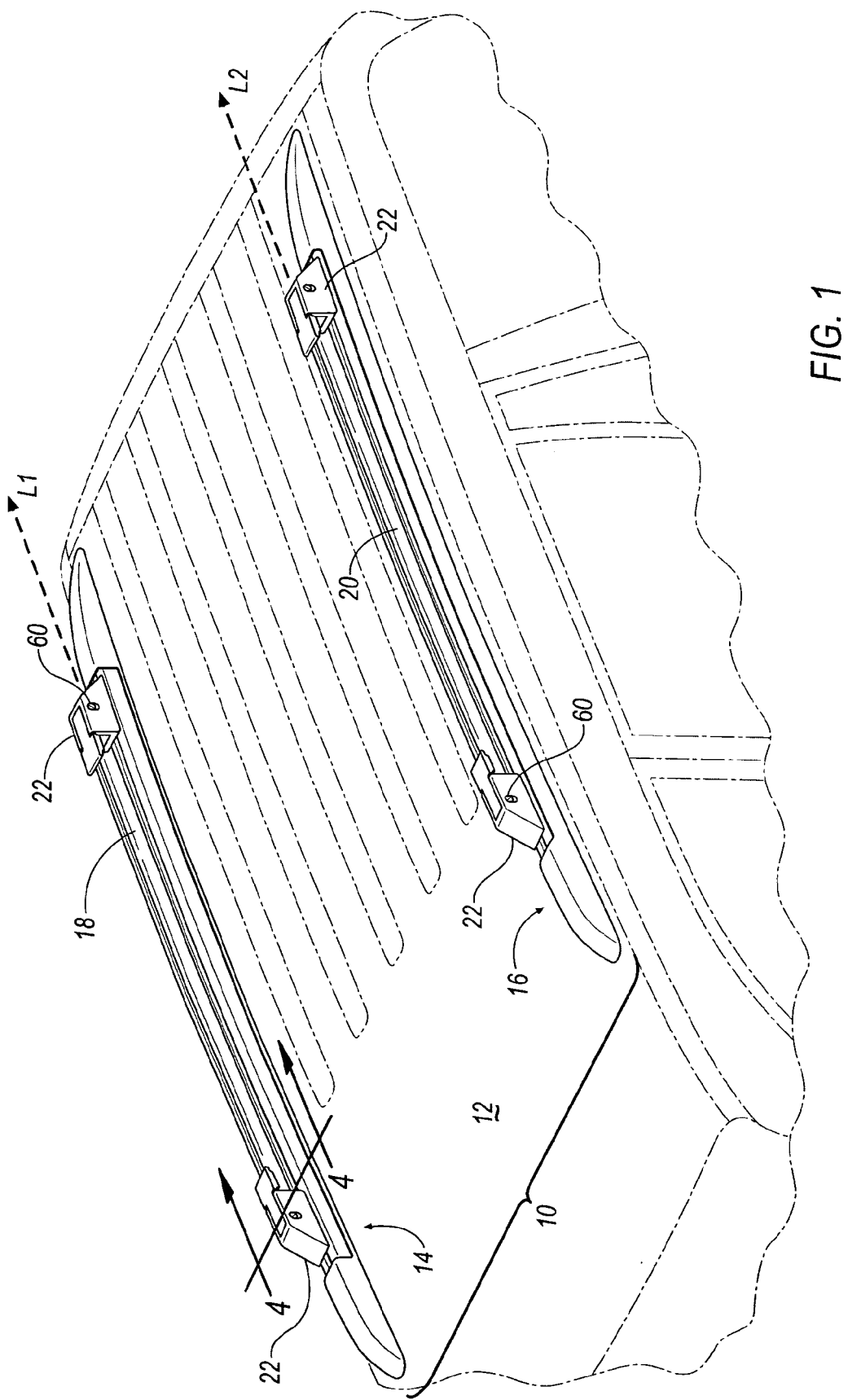
FIG. 1 is a perspective view of an article carrier assembly in accordance with the present invention, showing a pair of cross-rails in a stowed position.
Figure 2:
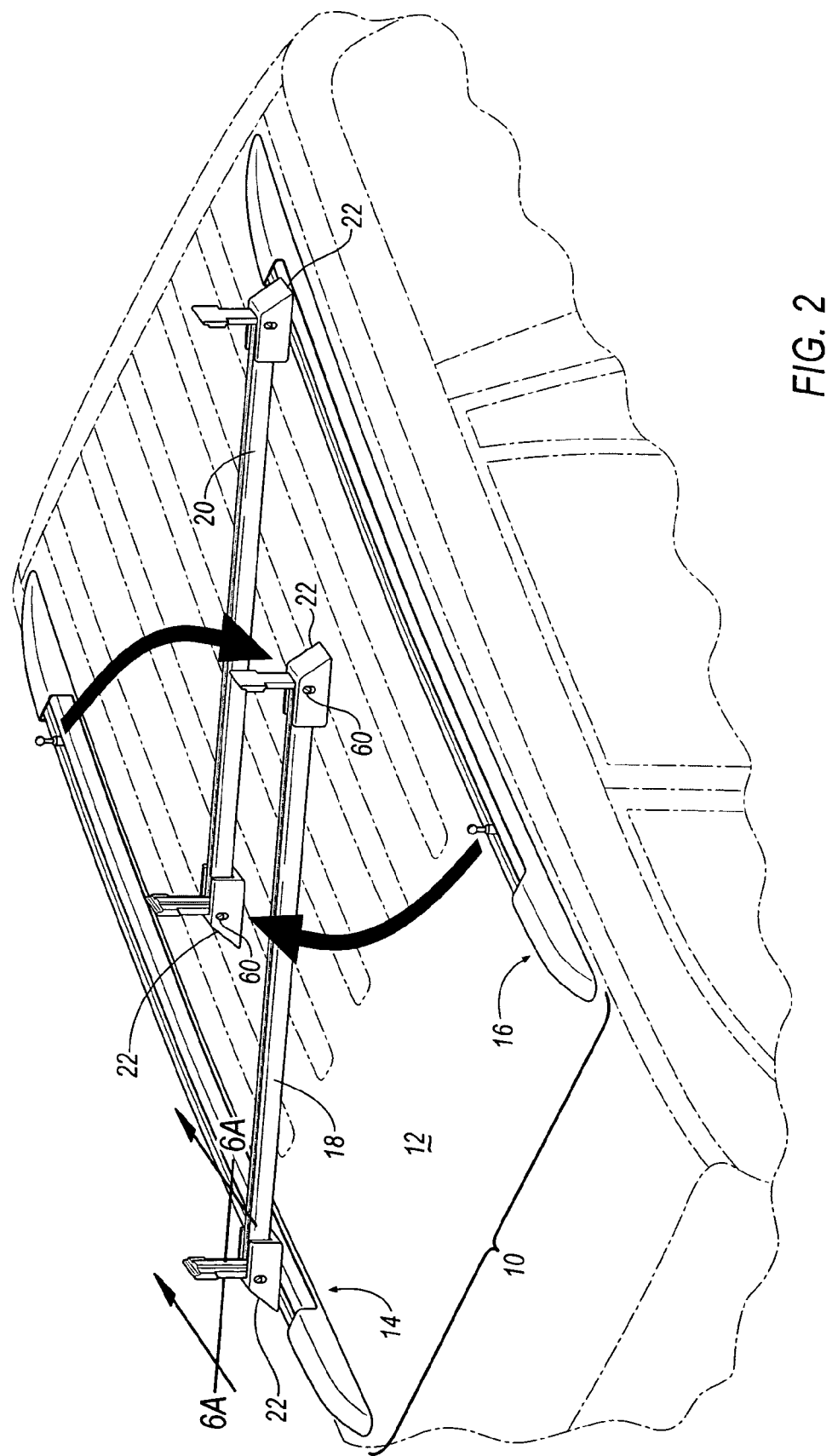
FIG. 2 is a perspective view of the article carrier assembly of FIG. 1 showing the cross-rails in a partially deployed position.
Figure 3:
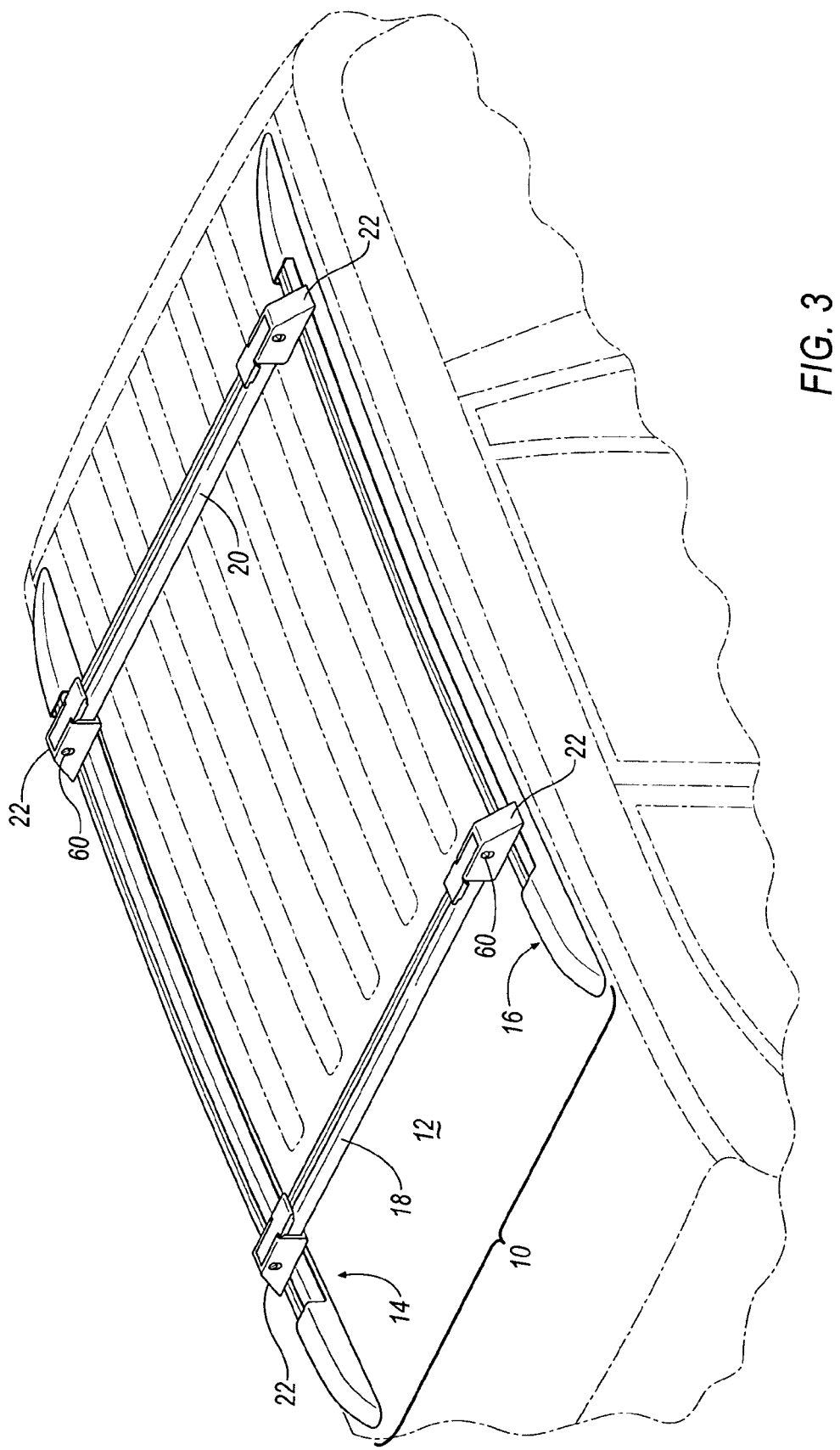
FIG. 3 is a perspective view of the article carrier assembly of FIG. 1 showing the cross-rails in a fully deployed position.

FIGS. 1-3 show a partial, perspective view of an article carrier assembly 10 according to the present invention. It is secured to a vehicle roof panel 12 and depicted in its stowed position (FIG. 1), in a partially deployed position (FIG. 2) and in a fully deployed position (FIG. 3). The embodiment of the article carrier assembly 10 shown in FIGS. 1-3 comprises a first siderail 14, a second siderail 16, a first cross-rail 18, a second cross-rail 20, and four identical latching mechanisms generally designated by a reference number 22. A body of each of the latching mechanisms 22 is attached to a respective cross-rail, two mechanisms being assigned to each of the cross-rails. The first and second siderails 14, 16 are made substantially identical, configured to be mounted to the vehicle roof panel 12, disposed generally along respective longitudinal axes designated L1 and L2, and transversely spaced apart from each other. As will be described below, siderails 14, 16 are adapted to stow and support cross-rails 18, 20. Each of the first and second siderails 14 and 16 is provided with a track, described in greater detail below, for allowing slidable movement of the latching mechanisms 22 along the siderails.

The cross-rails 18, 20 are configured to support articles, such as luggage and the like. In a preferred embodiment, the cross-rails 18, 20 are made with the use of a lightweight metal, such as aluminum, to obtain needed strength objectives (i.e., to support articles), while remaining sufficiently light for easy movement. While the embodiments illustrated in FIGS. 1-3 include two cross-rails 18, 20, it is understood that other embodiments of the present invention may include a greater or lesser number of cross-rails.

Figure 4:
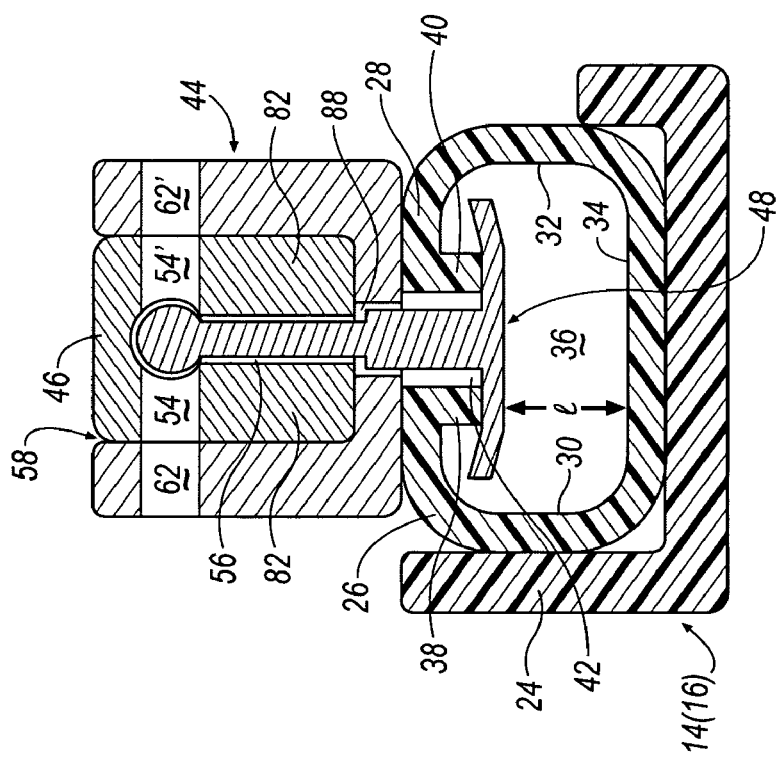
FIG. 4 is a cross-section view approximately along line 4-4 of FIG. 1 showing a latching mechanism locked onto a siderail.
Figure 6A:
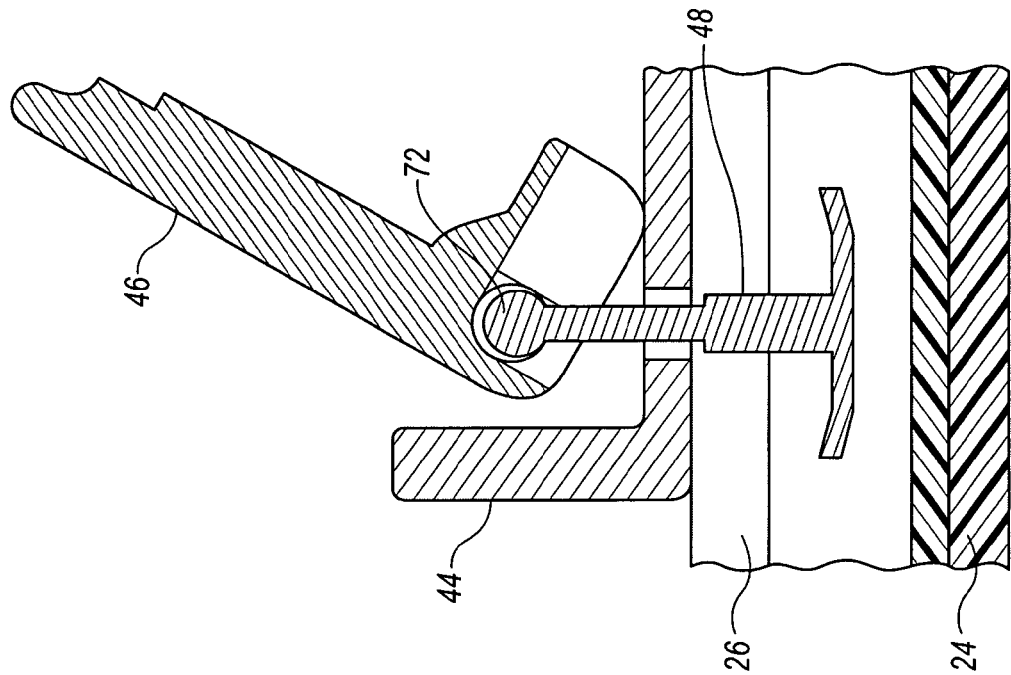
FIG. 6A is a cross-section view approximately along line 6A-6A of FIG. 2 showing the latching mechanism in an unlocked position, whereas FIGS. 6B-6D schematically illustrate the latching mechanism successively changing through partially locked positions (FIGS. 6B, 6C) to a locked one (FIG. 6D)
Figure 6B:
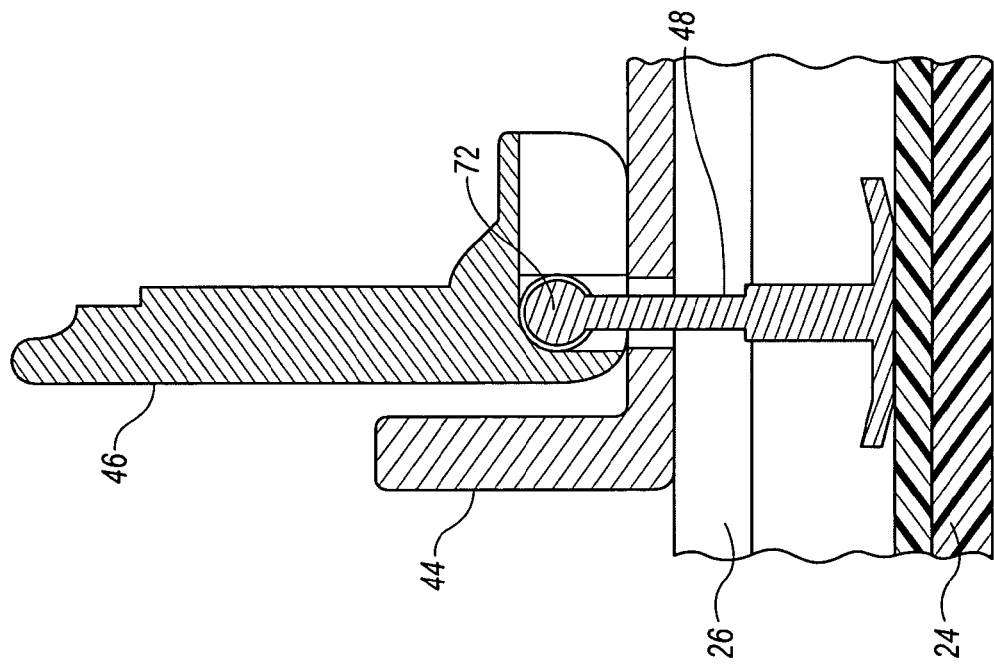

Referring now to FIG. 4, which is a cross-section of a portion of the article carrier assembly 10 taken substantially along lines 4-4 in FIG. 1, the siderail 14 (16) comprises an L-shaped elongated base portion 24 and an elongated track 26 rigidly fixed within the base portion 24. It is by the base portion 24 that the siderail 14 (16) is attached to the roof panel 12 of the vehicle. The track 26 is shaped into a tube of a substantially rectangular profile in a preferred embodiment. It has an upper wall 28, side walls 30, 32, and a lower wall 34, the walls in their aggregation defining a hollow 36. The upper wall 28 is cut lengthwise, edges 38, 40 of the cut being bent inwardly and forming a slot 42 therebetween that longitudinally extends through the wall 28. Whereas the track 26 is made preferably of metal, the base portion 24 can be produced with the use of plastic and/or metal.

Figure 5:
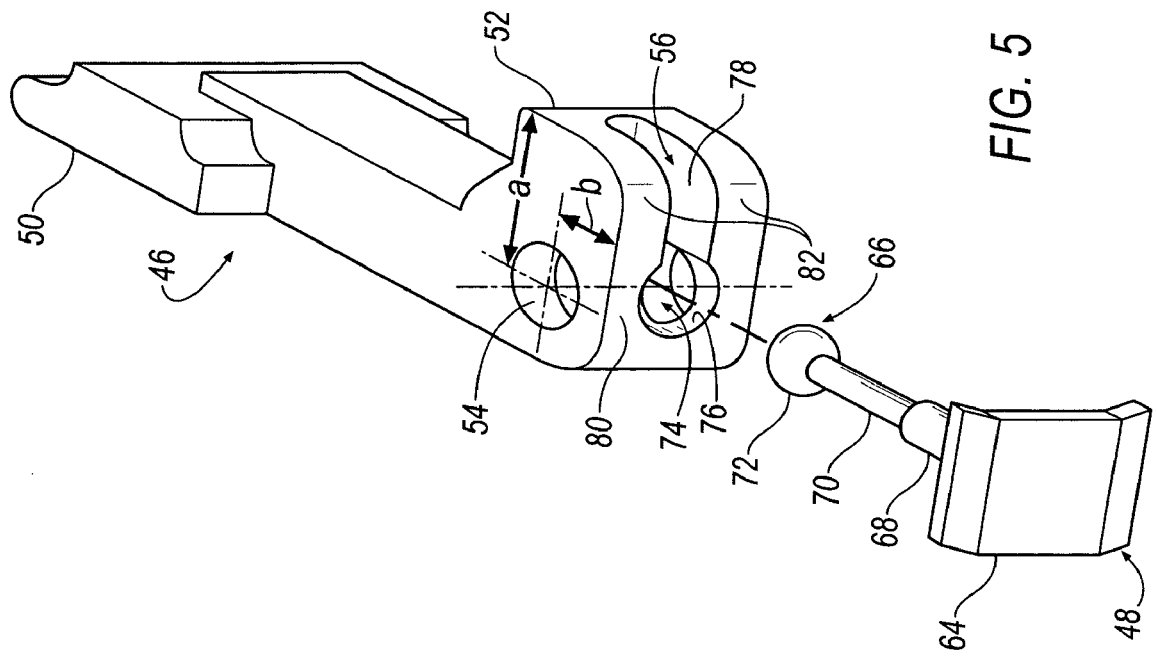
FIG. 5 is a perspective view of a lock plate assembly and a lever of the latching mechanism.

The latching mechanism 22, which is shown in FIG. 4 locked onto the siderail 14 (16), comprises a first member including the body having a stanchion 44 with a lever 46, as well as a second member including a lock plate assembly 48. The first member of the mechanism 22 is associated with the cross-rail, whereas the second member of the mechanism 22 is slidably retained within the siderail. The lever 46 best shown in FIG. 5 is an L-shape element. It has a handle 50 and a base portion 52, and is provided with pin holes 54 and 54' and a cam pocket 56 made therein. The lever 46 is placed into a lever pocket 58 of the stanchion 44 and pivotally secured to the latter by means of pins 60 visible in FIG. 1 and passing from the opposite sides of the stanchion 44 through pin holes 62 and 62' of the stanchion 44 and the pin holes 54 and 54' of the lever 46.

The lock plate assembly 48 includes a lock plate 64 and a ball stud 66. The assembly 48 sits in the hollow 36 of the track 26, with the ball stud 66 projecting therefrom through the slot 42. The lock plate assembly 48 fulfils the role of a connecting element between the siderail (14, 16) and the body of the latching mechanism 22, the edges 38, 40 of the upper wall 28 of the track 26 acting as stops for the lock plate 64 in the upward-directed movement thereof. It is due to the slot 42 that the assembly 48 (and the locking mechanism 22) is slidable longitudinally along axes L1 and L2. The distance l that the assembly 48 can travel vertically between the locked and unlocked positions of the latching mechanism 22 is preferably between 2 and 5 mm, and it is in balance with the difference between the distance a and distance b in FIG. 5. The ball stud 66 includes a cylindrical bottom portion 68, a cylindrical central portion 70, and a ball-shaped top portion 72. Respectively, the cam pocket 56 is shaped into a cylindrical channel 74 with an opening 76 and a cut-out 78. The opening 76 in a bottom 80 of the base portion 52 is made fit for the ball top portion 72, whereas a cut-out 78 defined by side walls 82 of the base portion 52 is made wide enough to let the central portion 70 of the ball stud 66 pass therethrough and narrow enough not to let the ball top portion 72 of the ball stud 66 pass therethrough.

As best shown in FIGS. 7 and 8, the stanchion 44 of the latching mechanism 22 is composed of a bottom wall 84 and a side wall 86, preferably U-shaped, defining the lever pocket 58. There is an orifice 88 made in the bottom wall 84 and symmetrically located with regard to the side wall 86. The orifice 88 is substantially coaxial with the opening 74 of the lever 46 in the respective position thereof, and it is made large enough to unobtrusively let the ball stud 66 pass therethrough. A connection between the latching mechanism 22 and the cross-rails 18, 20 can be realized through the use of any conventional means. In the embodiment under consideration, the connection is made by means of an extension 90 of the bottom wall 84 of the stanchion 22, to which extension 90 the cross-rail (18, 20) can be attached by bolts, screws; welded, or affixed by any other conventional means. The bottom wall 84 and the extension 90 of the stanchion 22 may be provided with a pad 92 of rubber or plastic to protect the roof panel 12 of the vehicle. In view of the connection between the siderail and lock plate assembly discussed in the above, on one hand, and the connection between the stanchion and the cross-rail, on the other hand, a connection between the siderails 14, 16 and cross-rails 18, 20 can thus be established with the use of the latching mechanism 22.

In the starting position of the article carrier assembly according to the present invention illustrated in FIG. 1, the cross-rails 18, 20 are stowed onto the siderails 14, 16, respectively, affixed thereto by latching mechanisms 22, which are in the position best shown in FIG. 4. The lock plate assembly 48 of each of the latching mechanisms 22 is its uppermost position, the lock plate 64 meeting the edges 38, 40 and the top portion 72 of the ball stud 66 being engaged by the walls 82 of the lever base portion 52.

In operation, the lever 46 of one of the latching mechanisms 22, taken by the handle 50, is rotated around the pin 60 approximately 90° up (back, toward the plane of the drawing from the position shown in FIG. 4) to disengage the ball stud 66 and the stanchion 44. Unrestricted anymore by the walls 82, the lock plate assembly 48 drops down to the lower wall 34 of the track 26. As a result of the disengagement, the cross-rail and the siderail at this point of connection thereof become disengageable. Similarly released from the siderail at the opposite side thereof, the cross-rail can now be lifted, rotated, placed transversely with regard to the siderails 14, 16 and affixed to the siderails, the deployment with the lock plate assembly in the opposite siderail being realized in the order reverse to that discussed in the above. The succession of positions illustrating locking the cross-rail onto the siderail in the course of deploying the carrier is shown in FIGS. 6A-6D in greater detail (with portions thereof omitted for clarity). Specifically, the stanchion 44/lever 46 assembly is placed over the ball top portion 72 of the ball stud 66. The lever 46 is being rotated down to engage the ball 72 on the stud 66. The lever then "cams" on the stanchion 44 being turned through approximately 90° and thus raises the lock plate 64 of the lock plate assembly 48 two to five mm to lock onto the siderail.

The length of the cross-rail has to correspond to the span between the siderails that can be achieved either by matching the span by a one-piece cross-rail lengthwise or by making shorter cross-rails telescopic. The option with shorter cross-rails makes it possible to stow more than one cross-rail along one siderail. It is also appreciated that having cross-rails longitudinally slidable, to thus provide adjustability for the cross-rails, has the advantage of reducing the cost of the article carrier assembly. In addition, such an arrangement stimulates the end user to properly load the article carrier assembly (i.e., starting from the forward portion of the carrier assembly).

While it is the best mode for carrying out the invention that has been described in detail hereinabove, it is to be understood that this embodiment is given by example only and not in a limiting sense and those familiar with the art to which this invention pertains will recognize various alternative designs and embodiments for practicing the invention without departing from the spirit and scope of the present contribution to the art. For example, as it was briefly mentioned in the above, there can be one cross-rail or more than two cross-rails in the assembly according to the present invention. The whole assembly with one cross-rail in the deployed position may have a U-shape, H-shape, or N-shape in the top view thereof, whereas the assembly with more than two cross-rails may require telescopic cross-rails to be of a lesser length for the stowing position and of a bigger length to span the space between the siderails for the deployment. Accordingly, it is to be realized that the patent protection sought and to be afforded hereby shall be deemed to extend to the subject matter claimed and all equivalence thereof fairly within the scope of the invention.

What is claimed is:

1. An article carrier assembly for attachment to a vehicle, comprising:
   a first and second side rail spaced from each other,
   a first cross-rail having a stowed position and a deployed position,
   a first latch member attached to an end of said first cross-rail,
   wherein said first and second side rails respectively include first and second lock plates,
   wherein said first latch member is adapted to engage said first lock plate when said first cross-rail is in said stowed position, and wherein said first latch member is adapted to engage said second lock plate when said first cross-rail is in said deployed position;
   wherein said first latch member includes a lever pocket and a lever secured to said lever pocket; and
   wherein said first and second lock plates include a ball stud portion adapted to fit within said lever pocket.

2. An article carrier assembly for attachment to a vehicle, comprising:
   a first and a second siderails spaced from each other and configured to be mounted to a vehicle roof panel;
   a first and a second cross-rails adapted to be stowed on said siderails, removed therefrom, and deployed across said siderails; and
   latching mechanisms to engage said siderails and said cross-rails in stowed and deployed positions thereof,
   each of said latching mechanisms comprising a first latching member adapted to be attached to a respective cross-rail of said first and said second cross-rails, and a second latching member adapted to be slidably retained in a respective siderail of said first and said second siderails,
   said first member and said second member of said each of said latching mechanism are configured to allow to disengage said first member from said second member, and thus disengage said respective cross-rail from said respective siderail, and to engage said first member with a second member retained in an opposite siderail of said first and said second siderails, to thereby realize the deployment of said article carrier assembly;
   wherein said first member of said each of said latching mechanisms comprises a stanchion with a lever pocket and a lever pivotally secured to said stanchion in said pocket.

3. An article carrier assembly for attachment to a vehicle, comprising:
   a first and a second siderails spaced from each other and configured to be mounted to a vehicle roof panel;
   a first and a second cross-rails adapted to be stowed on said siderails, removed therefrom, and deployed across said siderails; and
   latching mechanisms to engage said siderails and said cross-rails in stowed and deployed positions thereof,
   each of said latching mechanisms comprising a first latching member adapted to be attached to a respective cross-rail of said first and said second cross-rails, and a second latching member adapted to be slidably retained in a respective siderail of said first and said second siderails,
   said first member and said second member of said each of said latching mechanism are configured to allow to disengage said first member from said second member, and thus disengage said respective cross-rail from said respective siderail, and to engage said first member with a second member retained in an opposite siderail of said first and said second siderails, to thereby realize the deployment of said article carrier assembly;
   wherein said second member of said each of said latching mechanisms includes a lock plate assembly comprising a lock plate and a ball stud attached thereto.

4. The article carrier assembly as claimed in claim 3, wherein each of said first and second siderails comprises a base portion and a track fixed thereto, said track being shaped into a tube with an upper wall, side walls and a lower wall, said upper wall, side walls and a lower wall defining a hollow, said upper wall being cut lengthwise, and said slidably retaining said second member in said respective siderail of said first and said second siderails is realized by placing said lock plate assembly into said hollow with said ball stud projecting outwardly.

5. The article carrier assembly as claimed in claim 4, wherein edges of said cut are bent inwardly to form a slot extending longitudinally through said upper wall, said edges serving stops for said lock plate, said outward projecting of said ball stud is realized through said slot.

6. The article carrier assembly as claimed in claim 5, wherein said ball stud is made with a ball portion at the top thereof and a central portion of a lesser transversal size than said ball portion, said first member of said each of said latching mechanisms comprises a stanchion with a lever pocket and a lever pivotally secured to said stanchion in said pocket to assume an unlocked position or a locked position, said stanchion comprising a bottom wall and a side wall, said bottom wall being provided with an orifice, said lever comprising a handle and a base portion, said base portion being provided with a cylindrical channel and a cutout, said orifice being coaxial with said channel in said unlocked position of said lever and adapted to receive said ball stud into said channel, said cutout being of a width which matches said transversal size of said central portion of said ball stud and prevents said ball portion of said ball stud from dropping out of said lever in said locked position thereof.

7. The article carrier assembly as claimed in claim 6, further comprising a pad to cover said bottom wall of said stanchion.

8. An article carrier assembly for attachment to a vehicle, comprising:
  a first and a second siderails spaced from each other and configured to be mounted to a vehicle roof panel;
  at least a first cross-rail adapted to be stowed on either of said siderails, removed therefrom, and deployed across said siderails attached thereto; and
  latching mechanisms to engage said siderails and said at least a first cross-rail in stowed and deployed positions thereof
  each of said latching mechanisms being composed of a first member and a second member, first members being attached to said at least first cross-rail at an end area thereof and second members being slidably retained in said first and said second siderails,
  said first members and said second members of said latching mechanism are configured to allow to disengage at least one of said first members from a respective one of said second members and thus disengage said at least a first cross-rail from said either of said siderails at a point of engagement for stowing, and engage said at least one of said first members with another of said second members retained in another of said siderails, to thereby realize the deployment of said article carrier assembly;
  wherein said first member comprises a stanchion with a lever pocket and a lever pivotally secured to said stanchion in said pocket.

9. An article carrier assembly for attachment to a vehicle, comprising:
  a first and a second siderails spaced from each other and configured to be mounted to a vehicle roof panel;
  at least a first cross-rail adapted to be stowed on either of said siderails, removed therefrom, and deployed across said siderails attached thereto; and
  latching mechanisms to engage said siderails and said at least a first cross-rail in stowed and deployed positions thereof
  each of said latching mechanisms being composed of a first member and a second member, first members being attached to said at least first cross-rail at an end area thereof and second members being slidably retained in said first and said second siderails,
  said first members and said second members of said latching mechanism are configured to allow to disengage at least one of said first members from a respective one of said second members and thus disengage said at least a first cross-rail from said either of said siderails at a point of engagement for stowing, and engage said at least one of said first members with another of said second members retained in another of said siderails, to thereby realize the deployment of said article carrier assembly;
  wherein said second member includes a lock plate assembly comprising a lock plate and a ball stud attached thereto.

10. The article carrier assembly as claimed in claim 9, wherein each of said first and second siderails comprises a base portion and a track fixed thereto, said track being shaped into a tube with an upper wall, side walls and a lower wall, said upper wall, side walls and a lower wall defining a hollow, said upper wall being cut lengthwise, and said slidably retaining said second members in said first and said second siderails is realized by placing the lock plate assemblies into the hollows with the ball studs projecting outwardly.

11. The article carrier assembly as claimed in claim 10, wherein edges of said cut are bent inwardly to form a slot extending longitudinally through said upper wall, said edges serving stops for said lock plates, said outward projecting of said ball studs is realized through said slot.

12. The article carrier assembly as claimed in claim 11, wherein each of said ball studs is made with a ball portion at the top thereof and a central portion of a lesser transversal size than said ball portion, each of said first members of said latching mechanisms comprises a stanchion with a lever pocket and a lever pivotally secured to said stanchion in said pocket to assume an unlocked position or a locked position, said stanchion comprising a bottom wall and a side wall, said bottom wall being provided with an orifice, said lever comprising a handle and a base portion, said base portion being provided with a cylindrical channel and a cutout, said orifice being coaxial with said channel in said unlocked position of said lever and adapted to receive said each of said ball studs into said channel, said cutout being of a width matching said transversal size of said central portion of said each of said ball studs and prevents said ball portion of said each of said ball studs from dropping out of said lever in said locked position thereof.

13. The article carrier assembly as claimed in claim 12, further comprising a pad to cover said bottom wall of said stanchion.

14. An article carrier assembly for attachment to a vehicle, comprising:
  a first and a second siderails spaced from each other and configured to be mounted to a vehicle roof panel;
  a first and a second cross-rails adapted to be stowed on said siderails, removed therefrom, and deployed across said siderails; and
  latching mechanisms to engage said siderails and said cross-rails in stowed and deployed positions thereof
  each of said latching mechanisms comprising a first latching member adapted to be attached to a respective cross-rail of said first and said second cross-rails, and a second latching member adapted to be slidably retained in a respective siderail of said first and said second siderails;
  said attachment of said first member of said each of said latching mechanisms to said respective cross-rail of said first and said second cross-rails being made at an end area of said respective cross-rail;
  said first member of said each of said latching mechanisms comprising a stanchion with a lever pocket and a lever pivotally secured to said stanchion in said pocket to assume an unlocked position or a locked position;

said second member of said each of said latching mechanisms including a lock plate assembly comprising a lock plate and a ball stud attached thereto;

each of said first and second siderails comprising a base portion and a track fixed thereto, said track being shaped into a tube with an upper wall, side walls and a lower wall, said upper wall, side walls and a lower wall defining a hollow, said upper wall being cut lengthwise, said slidably retaining said second member in said respective siderail of said first and said second siderails being realized by placing said lock plate assembly into said hollow with said ball stud projecting outwardly;

edges of said cut being bent inwardly to form a slot extending longitudinally through said upper wall, said edges serving stops for said lock plate, said outward projecting of said ball stud being realized through said slot;

said ball stud being made with a ball portion at the top thereof and a central portion of a lesser transversal size than said ball portion, said stanchion comprising a bottom wall and a side wall, said bottom wall being provided with an orifice, said lever comprising a handle and a base portion, said base portion being provided with a cylindrical channel and a cutout, said orifice being coaxial with said channel in said unlocked position of said lever and adapted to receive said ball stud into said channel, said cutout being of a width which matches said transversal size of said central portion of said ball stud and prevents said ball portion of said ball stud from dropping out of said lever in said locked position thereof whereby said first member and said second member of said each of said latching mechanism are allowed to disengage from each other, thus releasing said respective cross-rail from said respective siderail, and said first member is allowed to engage with a second member retained in an opposite siderail of said first and said second siderails after said cross-rails have been placed across said siderails, to thereby realize the deployment of said article carrier assembly.

15. The article carrier assembly as claimed in claim 14, further comprising a pad to cover said bottom wall of said stanchion.

* * * * *